US000001356H

United States Statutory Invention Registration [19]

[11] Reg. Number: H1356

McCormick et al.

[43] Published: Sep. 6, 1994

[54] BOMB SENSOR SYSTEM

[75] Inventors: Howard C. McCormick, Crestview; David M. Onuffer, Mary Esther, both of Fla.

[73] Assignee: The United States of America as represented by the Secretary of the Air Force, Washington, D.C.

[21] Appl. No.: 583,613

[22] Filed: Sep. 17, 1990

[51] Int. Cl.[5] ..... H04R 17/00

[52] U.S. Cl. ..... 364/423; 367/135; 367/178; 367/180; 367/906

*Primary Examiner*—Bernarr E. Gregory

*Attorney, Agent, or Firm*—Bernard E. Franz; Donald J. Singer

[57] ABSTRACT

The system is a remotely operated, autonomous multichannel time history recording device which uses digital and computer technologies to detect, record and display the results of tests that are time varying dependent. It is particularly suited to monitoring the effects of exploding warheads. By placing a series of piezoelectric detectors in an exploding shock wave field, it is possible to ascertain the wavefront propagation. A dynamic peak detector is used is used with each piezoelectric detector to detect the exact peak of the unknown pulse which peak defines the "time-of-arrival" of the pulse. By controlling the system with a computer program it is possible to display the complete time history of the propagating shock wave. When the exploding device is detonated a counter increments in 100 ns steps with its output on a timing bus. As each piezoelectric detector/-peak detector circuit senses the wavefront its respective channel is triggered and the associated data register extracts the time from the timing bus. By linking a computer to the Bomb Sensor System recorded data is available for review within 12.8 seconds after completion of the test. All test results are stored in the memory unit and is transferred to the host computer. Running the computer software program then displays the complete time history of the propagating shock wave. This empirical data when compared to a theoretical analysis reveals any anomalies or validates the test.

4 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BOMB SENSOR SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a bomb sensor system.

An antiquated system that triggers Silicon Controlled Rectifiers (SCR's) and uses the time base of an oscilloscope and an operator to judge the sequence of events yields questionable results. Only two channels of data could be gathered unless multi-oscilloscopes were used. The results were derived by an operator estimating time history. A single sweep of the scope of time base setting required to cover the entire time frame of interest would be about 500 micro seconds. Resolving any pulse with a 100 nano-second resolution is impossible. This method required an inordinate amount of electronic equipment and support system with results that were not scientific.

United States patents of interest include U.S. Pat. No. 2,998,719, to Rubin, which discloses a shock tube for studying blast effect damage to a target. The device of the Rubin patent is constructed for use with a warhead designed for an aerial missile. Tuck in U.S. Pat. No. 2,703,366 times the instant of arrival of a shock wave such as is produced by an explosion. U.S. Pat. No. 3,447,077 to Loxley et al describes a multiple missile velocity measuring screen and associated timing apparatus. Thayer in U.S. Pat. No. 3,513,697 measures the maximum pressure developed inside a cartridge when the cartridge is fired within the bore of a suitable firearm. Wirth et al in U.S. Pat. No. 4,725,138 measure the wavefront of a light beam 8, and D'Ausilio U.S. Pat. No. 4,726,224 is directed to a system for testing weapons in space.

SUMMARY OF THE INVENTION

An objective of the invention is to provide a system to record a number of distinct channels (64) of time interdependence data with a given resolution (100 nanoseconds). All data must be precise and not subjected to human discernment.

The invention is directed to a remotely operated, autonomous multi-channel time history recording device which uses digital and computer technologies to detect, record and display the results of tests that are time varying dependent. It is particularly suited to monitoring the effects of exploding warheads. By placing a series of piezoelectric detectors in an exploding shock wave field, it is possible to ascertain the wavefront propagation. A dynamic peak detector is used to detect the exact peak of the unknown pulse which peak defines the "time-of-arrival" of the pulse. Duplicating the peak detector and associated circuitry once for each channel (64 were chosen) a multichannel system is formed. By controlling the system with a computer program it is possible to display the complete time history of the propagating shock wave.

When the exploding device is detonated a sensor will be triggered and timing signals will be referenced to this signal (T-O). This electronic pulse enables a counter to increment in 100 nano-second steps (selectable) with its data outputted on a digital timing bus. As each piezoelectric detector/peak detector circuit senses the wavefront its respective channel is triggered and the associated data register extracts the precise time (relative to T-O) from the timing bus. After 409.5 micro-seconds (selectable) the recording of events is completed. Now after a delay an automatic sequence reads the data stored in the individual channel data registers and programs the data into a non-volatile memory unit. By linking a computer to the Bomb Sensor System via aNRS232 link recorded data is available for review within 12.8 seconds after completion of the test. All test results are stored in the memory unit and by using the specifically coded software written for this device that data is transferred to the host computer. Running the computer software program then displays the complete time history of the propagating shock wave. This empirical data when compared to a theoretical analysis reveals any anomalies or validates the test.

This device due to its universal design may be used in any test that requires multi-channel information in the time domain. The unit is most suitable in the R&D arena where velocity, projectile penetration and scoring information is required.

FIGS. *7a, 7b* and *7c* are diagrams showing different modes for operation of the peak detectors used on the trigger boards, which are, respectively as a dynamic peak detector, for peak detection with hysteresis, or as a threshold detector; and FIGS. *8a,* and *8c* are graphs showing operation of the circuits of FIGS. *7a, 7b* and *7c* respectively.

DETAILED DESCRIPTION

The purpose of this system is to record at least 64 distinct channels of time interdependence data with a resolution of 100 nanoseconds. All data must be precise and not subjected to human discernment.

The Bomb Sensor System is a remotely operated, autonomous multi-channel time history recording device. It uses digital and computer technologies to detect, record and display the results of tests that are time varying dependent. The system was explicitly designed to monitor the effects of exploding warheads, however, the design is flexible enough that it has many additional applications.

By placing a series of piezoelectric detectors in an exploding shock wave field, it is possible to ascertain the wavefront propagation. These detectors produce a pulse output of 100-nanosecond duration with an unpredictable amplitude due to the unsymmetrical wavefront distribution. Using a dynamic peak detector it is possible to detect the exact peak of the unknown pulse which is now referred to as the "time-of-arrival" of the pulse.

Duplicating the peak detector and associated circuitry once for each channel (64 were chosen) a multichannel system is formed.

Figure 1:
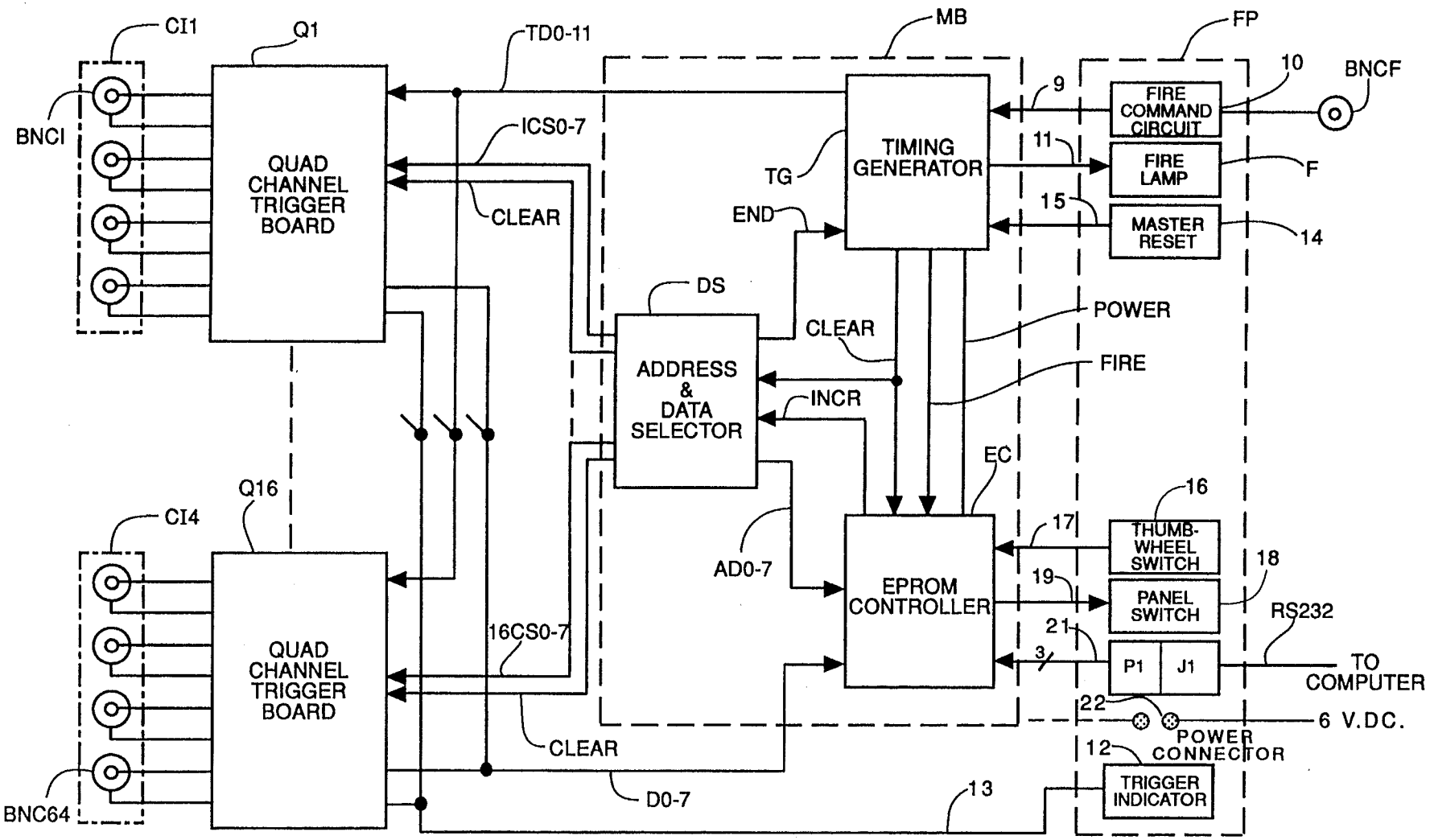
FIG. 1 is a block diagram showing a bomb sensor system according to the invention.

Referring to the block diagram of FIG. 1, the 64 peak detectors are organized on sixteen quad channel trigger boards Q1–Q16, with four peak detector circuits on each board. Inputs to the 64 peak detector circuits are via respective connectors BNC1–BNC64, to which the piezoelectric detectors (not shown) are connected. The input signals are connected to the quad channel trigger boards via backplane wiring.

A mother board (MB) has circuits including a timing generator (TG), an EPROM controller (EC), and an address and data selector (DS). The mother board is connected to the quad channel boards via backplane wiring. Mounted on a front panel (FP) and connected to the mother board are a fire command circuit 10 having an input BNC connector BNCF, a fire indicator lamp circuit F, a trigger indicator 12, a master reset switch 14, a thumbwheel switch 16, a panel switch 18, a plug P1 for a jack J1 connected via a RS232 line to a computer, and a power connector 22 for connection to a 6-volt DC source.

When the exploding device is detonated a sensor (not shown) connected to the connector BNCF will be triggered and timing signals will be referenced to this signal (T-0). This electronic pulse enables a counter in the timing generator TG to increment in 100-nanosecond steps (selectable) with its data outputted on a digital timing bus TD0–11. As each piezoelectric detector/-peak detector circuit senses the wavefront the respective channel is triggered and the associated data register extracts the precise time (relative to T-0) from the timing bus. After 409.5 micro-seconds (selectable) the recording of events is completed. Now after a one-second delay an automatic sequencer in the address and data selector DS reads the data stored in the individual channel data registers and programs the data into a non-volatile "Erasable Programmable Read Only Memory" (EPROM) in the EPROM controller EC. The EPROM is partitioned into eight sectors selected via the thumbwheel switch 16, with each sector dedicated to a specific test. Therefore, eight individual tests may be performed before it becomes necessary to replace or erase the EPROM. By linking a computer to the Bomb Sensor System via a RS232 link the recorded data is available for review within 12.8 seconds after completion of the test. All test results are stored in the EPROM and by using the specifically coded software written for this device that data is transferred to the host computer. Running the computer program then displays the complete time history of the propagating shock wave. This empirical data when compared to a theoretical analyses reveals any anomalies or validates the test.

Figure 2:
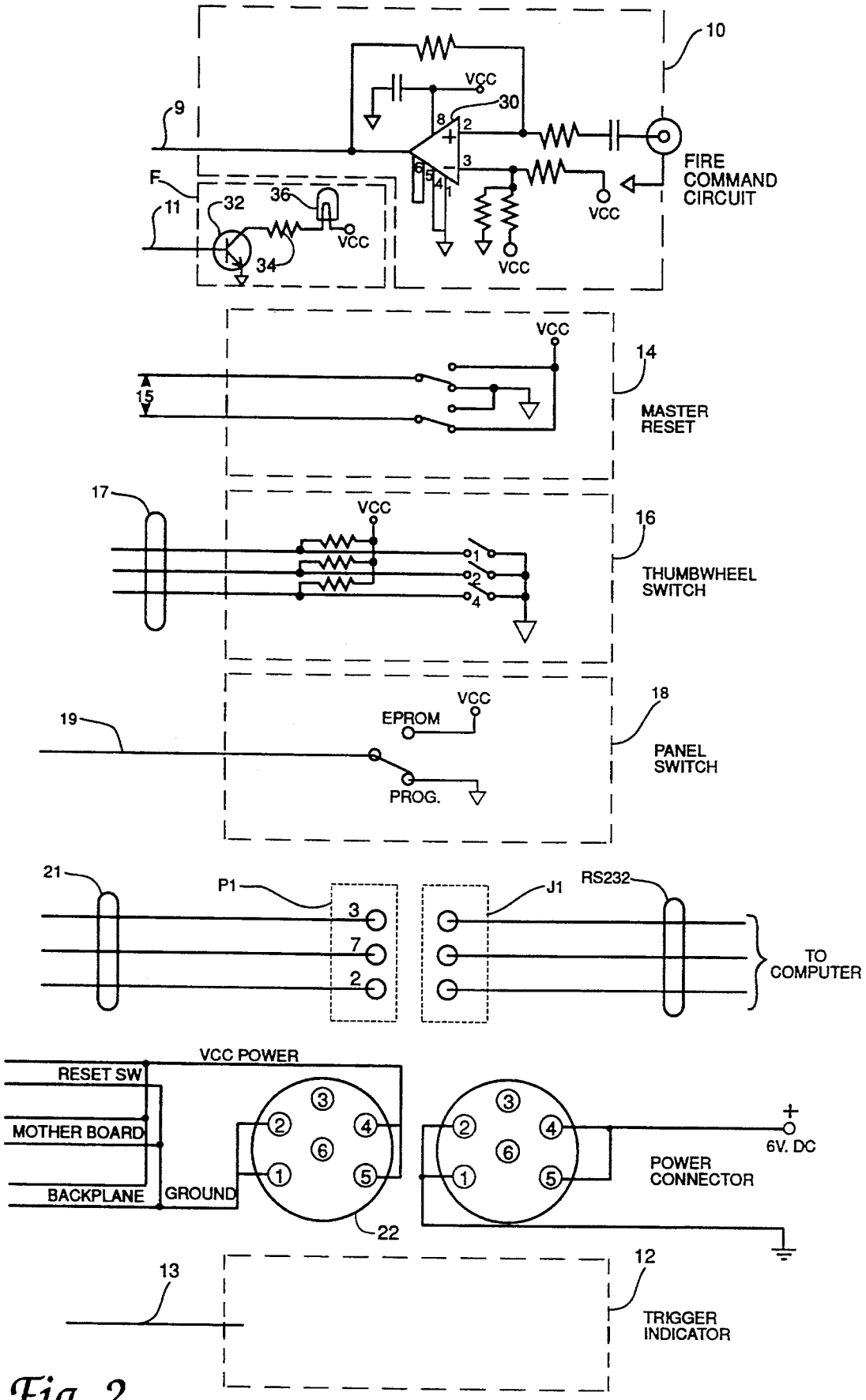
FIG. 2 is a schematic and functional block diagram of the front panel circuits of FIG. 1.

The circuits on the front panel FP are shown in FIG.2. The fire command circuit 10 is identical to the peak detector circuits on the quad channel trigger boards. A type CMP02 operational amplifier 30 has an input coupled to the connector BNCF via a resistor and capacitor, and an output to line 9. The fire indicator lamp circuit F includes an indicator lamp 36 connected in series with a resistor 34 between VCC power and the collector of a transistor 32. The base of the transistor is connected to a line 11, and its emitter is grounded.

The master reset switch 14 is a momentary double pole double throw switch connecting VCC power and ground to a two-conductor line 15. Momentary operation of the switch reverses the polarity on the conductors of line 15. The thumbwheel switch 16 is used to select a sector of the EPROM, using three contacts (with 1K pull up resistors to VCC) binary coded as 1, 2 and 4 to select any value from 0 to 7. The panel switch 18 is a single pole double throw switch which in a "EPROM" position connects VCC power to a line 19, and in a "PROG" position connects ground to the line.

The plug P1 is a type DB25 having 25 pins, but only the three pins 3, 7 and 2 connected to respective conductors of line 21 are shown. The jack J1 terminates a RS232 line for connection to a computer. The power connector 22 provides for connection of a 6-volt battery to the VCC power lines and ground at the reset switch 14, the mother board MB, and via the backplane wiring to the quad channel trigger boards.

The trigger indicator 12 has a yellow trigger light coupled via line 13 to the quad channel trigger boards, and lights when any channel on any board is triggered.

On the mother board, unless otherwise indicated, all NAND gates are type SN5400, AND gates are type SN5408, and inverters are type 74LS04.

Figure 3:
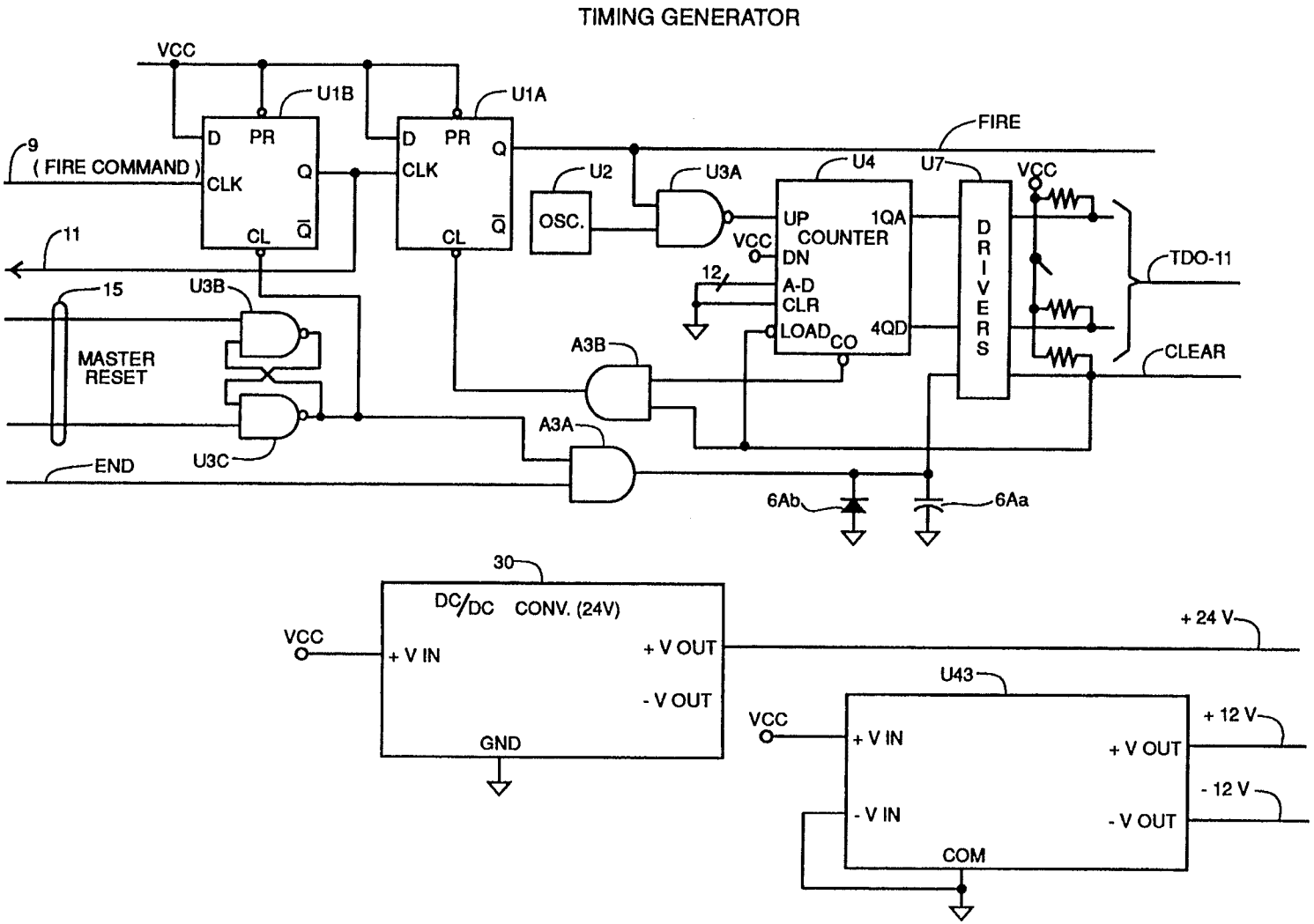
FIG. 3 is a schematic and functional block diagram of the timing generator of FIG. 1.

The principal unit of the timing generator TG shown in FIG. 3 is a counter U4. It comprises three 4-bit up/-down counter IC chips type SN54193 cascaded by connecting the carry out terminal CO of each of the first two chips to the UP input of the next. The UP terminal of the first chip is connected to the output of a NAND gate U3A, and the CO terminal of the third chip is connected to an input of an AND gate A3B. The borrow terminals BO (not shown) are not connected. The down count inputs DN are connected to VCC. The four parallel inputs A-D as well as the clear input CLR of each of the three chips are connected to ground. The LOAD inputs are connected to a line CLEAR, so that a low signal sets the counter to zero. Each of the three chips has four outputs QA–QD, and the twelve outputs are coupled via drivers U7 to the 12-conductor line TD1-11. The drivers U7 comprise seven type SN55461JP chips having two drivers per chip, with the outputs connected via 50-ohm pull up resistors to VCC. One driver on the seventh chip couples the output of gate A3A to the line CLEAR.

Two D flip flops U1A and U1B of a type SN5474 chip are used for the fire command. The D and PR inputs of the two flip flops are connected to VCC. Line 9 from the fire command circuit on the front panel is connected to the clock input of flip flop U1B, and the Q output of flip flop U1B is connected to the clock input of flip flop U1A. A positive going pulse on line 9 will set the flip flops U1B and U1A in succession. The output of flip flop U1B is connected via line 11 to light the fire lamp on the front panel. The Q output of flip flop U1A is connected to a line FIRE and to an input of gate U3A. An oscillator U2 is a type K1091A Unit having a 5-MHz crystal. The output of the oscillator is coupled via gate U3A to the UP input of the counter U4, so that in response to the FIRE command, the counter starts running and advances each 100 nanoseconds.

Two NAND gates U3B and U3C connected as a debounce latch have inputs from the two leads of the master reset line 15, and an output from gate U3C connected to the CL input of flip flop U1B and also to an input of AND gate A3A. The signals from gate U3C and on lead END are normally high and inactive; and when either signal goes low an active low signal from gate A3A via a driver appears on lead CLEAR. Gate A3B has inputs from lines CLEAR and the CO output of the last stage of the counter U4, and an output to the CL input of flip flop U1A, so that a low signal at either input of gate A3B resets the signal on line FIRE to stop the counter.

FIG. 3 also shows two power units 30 and U43 which are used with the EPROM control, each having a a +V IN terminal connected to the +6-volt source VCC. Unit 30 is a DC/DC converter providing 24 volts output at its terminal +V OUT to line +24V. Unit U43 provides ±12 volts, with its terminals +V OUT and −V OUT connected respectively to lines +12V and −12V.

Figure 4:
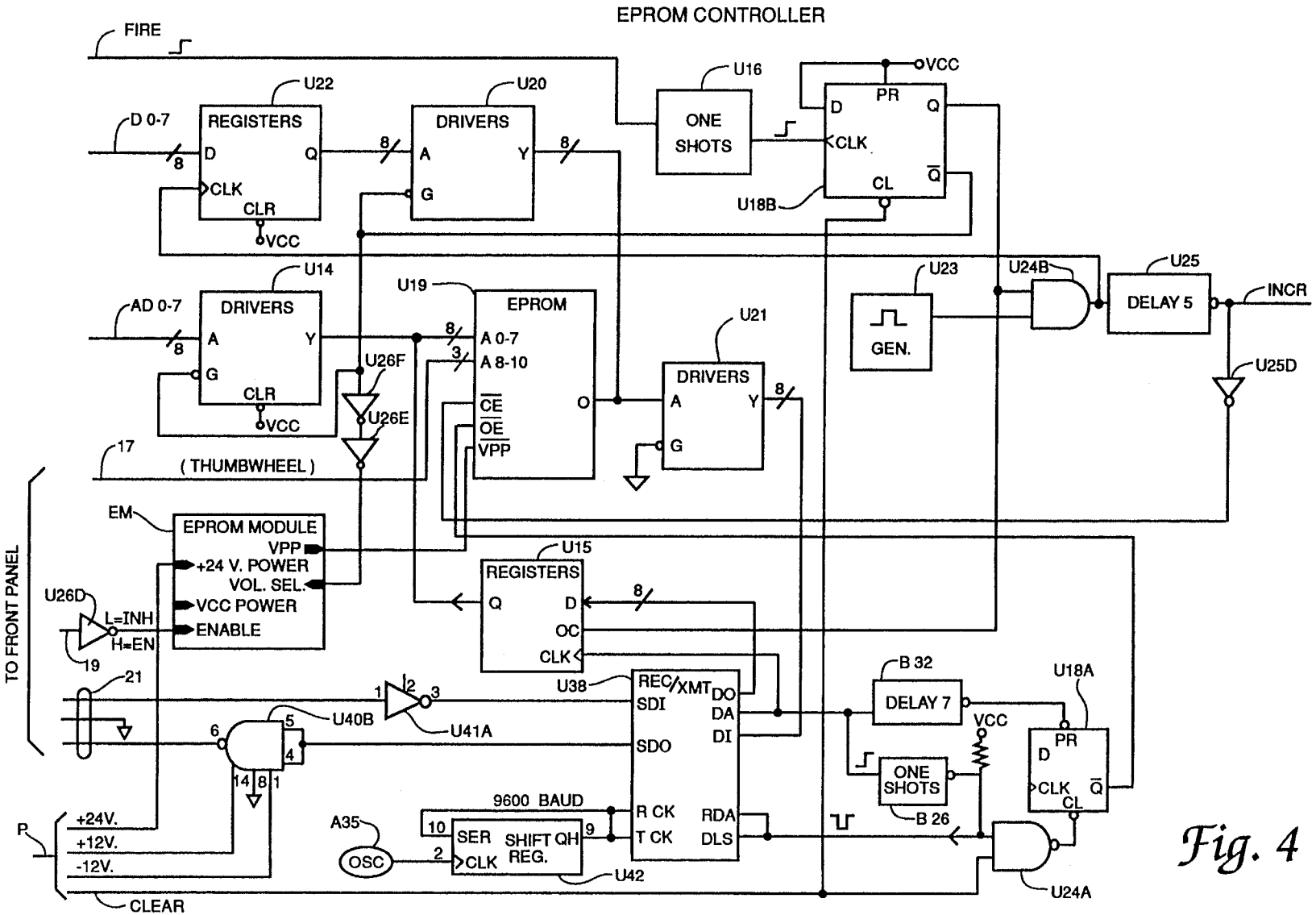
FIG. 4 is a schematic and functional block diagram of the EPROM controller of FIG. 1.

The EPROM controller of FIG.4 includes a type 2716 EPROM unit U19. The unit has eleven address inputs, shown grouped as eight inputs A0–7 and three inputs A8–10. There are eight terminals O0–O7, shown as O. Control terminals CE and OE are overlined to indicate active when low. Terminal VPP is connected to an EPROM module unit EM which supplies 24 volts to program or write data into the EPROM, and 5 volts to read from the memory U19.

The power input to the EPROM module unit EM is provided from the lines +24V. and VCC. The enable signal on line 19 from the front panel is coupled via an inverter U26D to an input "ENABLE" of the module EM, with a low signal for inhibit and a high signal for enable. An input terminal VOL. SEL. uses high and low inputs respectively to select 5 volts or 24 volts for the output at terminal VPP.

Register unit U15 is a type 54LS374 tri-state octal D-type positive-edge-triggered flip-flop chip; and register unit U22 is a type 54LS273 tri-state octal D-type edge-triggered flip-flop with clear chip. Driver units U14, U20 and U21 are type 54LS244 octal tri-state bus driver chips. The flip flops U18A and U18B comprise a type 54LS74 dual flip-flop chip.

Communication with the computer is provided by a type AY-5-1013A receiver/transmitter unit U38 The receive lead of line 21 is coupled via a type MC1489 receiver to an input terminal SDI of unit U38. The terminal SDO is coupled via a type MC1488 unit U40B to the send lead of line 21. Unit U40B has the +12V, −12V and ground leads connected to pins 14, 1 and 8 respectively. Unit U38 has eight data out terminals DO-0 to DO-7, shown as DO, connected to the eight D inputs of register chip U15; and eight data in terminals DI-0 to DI-7, shown as DI, connected to the eight Y outputs of driver chip U21. Terminal DA is connected to a delay unit B32 and also to the clock terminal of the register unit U15. Terminals RDA and DLS are connected to an output of a one shot unit B26. The receive and transmit clock terminals are connected to the QH output terminal of a type SN5165 shift register U42, which is also connected to the serial input terminal SER. The clock terminal is connected to a type K-1091A crystal oscillator A35 operating at 1.228 MHz, to provide 9600 baud operation. Other terminals shown ON shift register U42 are A, B, C and D connected to VCC; E, F, G, H and INH connected to ground; and SH/not LD connected via a 10 K resistor to VCC This ensures operation with a 50 duty cycle.

A sector of the EPROM memory unit U19 is selected via the three-conductor line 17 from the thumbwheel to the address inputs A8–10. The eight address inputs to terminals A0–7 are provided during a write operation from the timing generator, via line AD0–7 and the driver unit U14; and during a read operation from the receive/transmit unit U38 via the registers U15. Data signals to the eight terminals shown as O of memory U19 are provided during a write operation via line D0–7 and the register unit U22; and during a read operation data output is via the driver unit U21 to the receive/transmit unit U38.

The one-shot units U16 and U26 comprise type SN54221 chips, which are dual non-retriggerable one shots with clear and complementary outputs, all having CLR terminals connected to VCC.

In one-shot unit U16, the two one shots of a chip are connected with the Q output of the first to the A input of the second, the B input of the first to lead FIRE, the A input of the first to ground, and the B input of the second to VCC. The REXT/CEXT terminal of each is connected to the cathode of a type 1N914 diode, with the anode of the diode connected to the junction of a resistor and capacitor in series from VCC to the terminal CEXT. In the first one shot the resistor has a value of 40.2 K and the capacitor has a value of 100 microfarads (2 sec), and for the second one shot the resistor has a value of 15 K and the capacitor has a value of 0.1 microfarad (IMS). The Q output of the second one shot is connected to the clock input of the flip flop U18B.

Flip flop U18B has the D and PR terminals connected to VCC, and the CL terminal to lead CLEAR. The Q output of flip flop U18B is connected to terminal OC of the register unit U15; and the not Q output is connected to the gate inputs of driver units U14 and U20, and also via inverters U26F and U26G to the VOL. SEL. control input of the EPROM module EM.

In one-shot unit U26, the two one shots of a chip are connected with the Q output of the first to the A input of the second, the B input of the first to terminal DA of unit U38, the A input of the first to ground, and the B input of the second to VCC. The REXT/CEXT terminal of each is connected to the junction of a resistor and capacitor in series from VCC to the terminal CEXT. In the first one shot the resistor has a value of 10 K and the capacitor has a value of 180 picofarads (1no), and for the second one shot the resistor has a value of 10 K and the capacitor has a value of 100 picofarad (500NS) The not Q output of the second one shot is connected via a 1 K pull up resistor to VCC, to an input of gate U24A, and to terminals RDA and DLS of unit U38.

A delay unit B32 comprises seven inverters coupled from terminal DA of unit U38 to the PR terminal of flip flop U18A. Gates U24A and U24B are on a type SN5408 AND gate chip. Gate U24A has an input connected to lead CLEAR and its output to the CL terminal of flip flop U18A, so that when the signal at either the output of one shot unit B26 OR on lead CLEAR is low, the flip flop U18A is reset.

Unit U23 shown as a square wave pulse generator, comprises three type CD4049 inverters and a type CD4013 flip flop. The flip flop has S and R terminals connected to ground, a D terminal connected to its not Q output, and its Q output connected to an input of gate U24B. The three inverters are in tandem with the output of the last one connected to the clock input of the flip flop. A junction point is connected via a 56 K resistor to the input of the first inverter, via a 43.6 K resistor to the output of the last inverter, and via a 0.56 microfarad capacitor to the point between the output of the second inverter and the input of the last one.

A delay unit U25 comprises five inverters coupled from the output of gate U24B to lead INCR, so that when flip flop U18B is set, the pulses from the generator U23 are coupled with delay to lead INCR. An inverter U25D is connected from lead INCR to the CE terminal of the EPROM memory unit U19.

Figure 5:
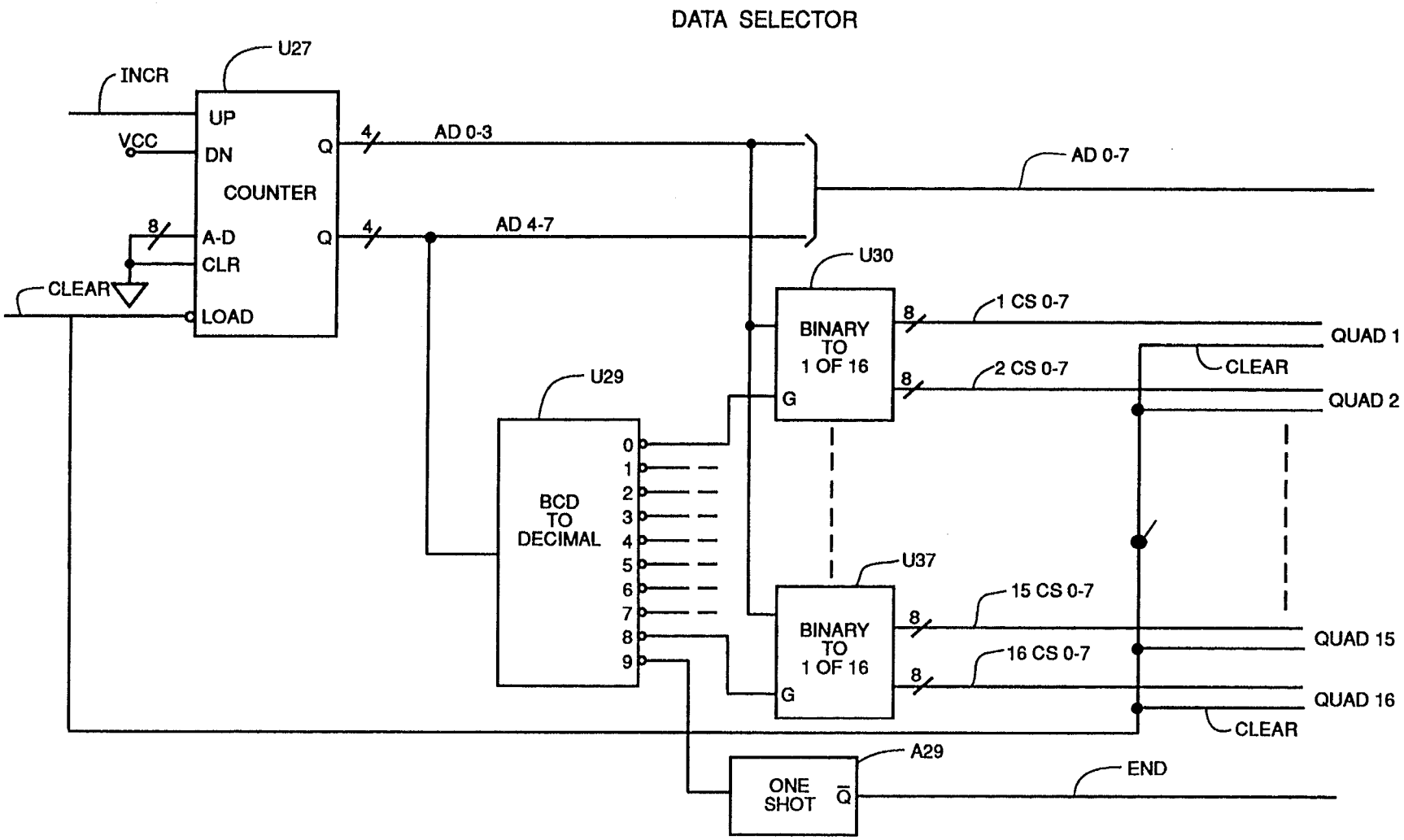
FIG. 5 is a schematic and functional block diagram of the data selector of FIG. 1.

The Data Selector shown in FIG. 5 comprises a counter and decoders for addressing the 64 trigger channels is sequence, with two addresses for each channel.

The counter U27 comprises two type SN54193 synchronous 4-bit binary up/down counter chips, with the four outputs QA–QD of each shown as Q. The UP count input of the first chip is connected to lead INCR, and the carry out terminal CO of the first is connected to the UP input of the second. The DN count inputs are connected to VCC. The four parallel inputs A-D and CLR inputs of each are connected to ground. The LOAD input of each is connected to lead CLEAR. The four outputs of the first chip are AD0-3, and the four outputs of the second chip are AD4-7. The eight leads AD0-7 go to the EPROM Controller of FIG. 4.

There are eight binary-to-1-of-16 decoder chips U30-U37, type SN54154, all having four inputs connected respectively to the four leads A0–3. Each of the decoders U30–U37 has sixteen outputs, eight to each of two quad channel trigger boards, with the first eight leads from decoder U30 shown as 1CS0-7 to the first quad board, on so on down to the last eight outputs of decoder U37 as leads 16CS0-7 to the sixteenth quad board.

A BCD-to-decimal decoder chip U29, type SN5442, has its four inputs connected respectively to the leads AD4-7. The decoded decimal outputs 1 to 8 are connected respectively to the gate inputs of the decoders U30–U37. The output 0 is unused, and the output 9 is used to trigger a one-shot unit A29 to indicate the program end.

The one-shot unit A29 uses only a single one shot of a type SN54221 chip connected with the not Q output connected to lead END. The A input is connected to the output 9 of decoder U29, and the B and CLR inputs to VCC. The REXT/CEXT terminal is connected to the cathode of a type 1N914 diode, with the anode of the diode connected to the junction of a resistor and capacitor in series from VCC to the terminal CEXT. The resistor has a value of 15 K and the capacitor has a value of 0.22 microfarads.

Figure 6:
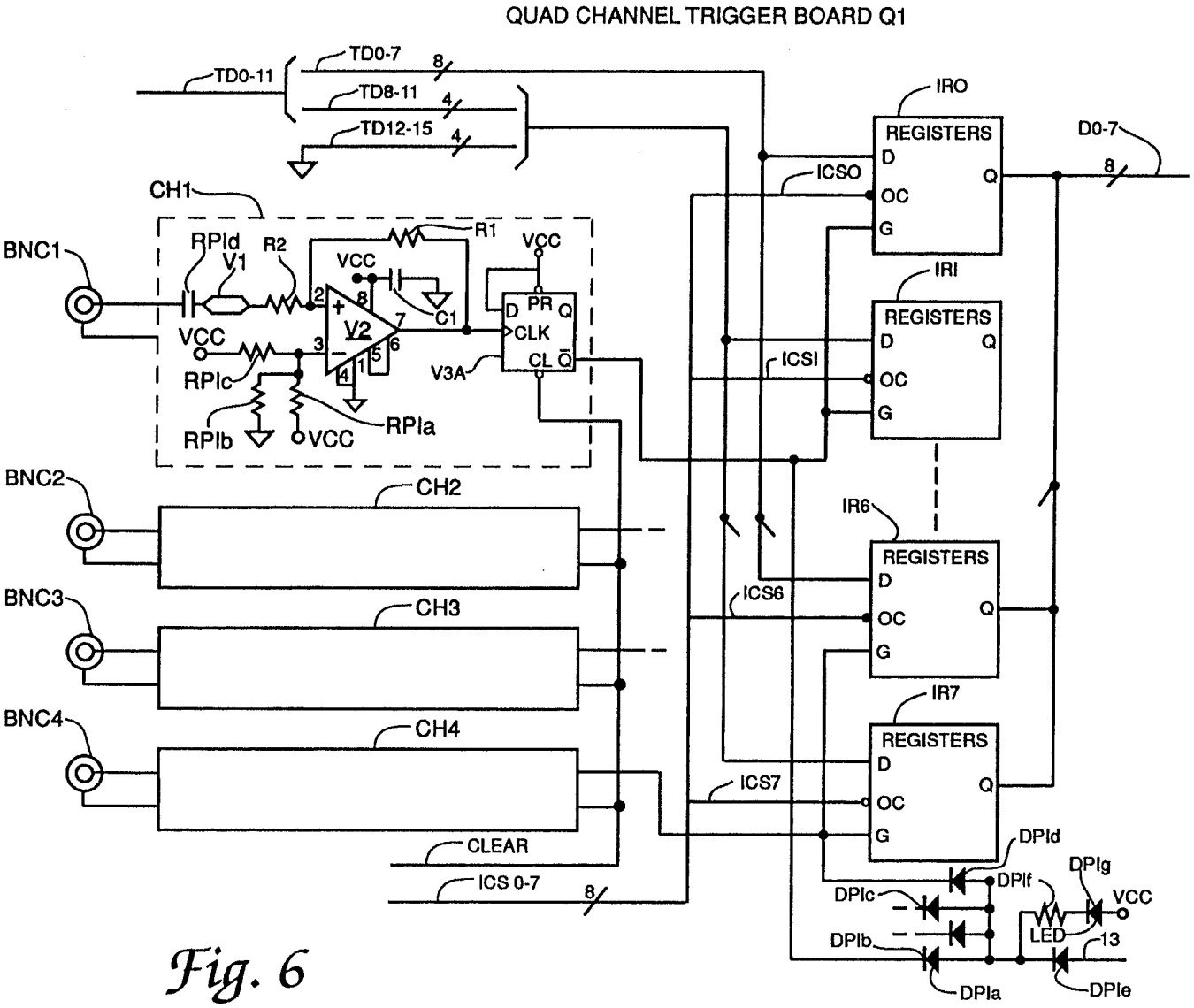
FIG. 6 is a schematic and functional block diagram of one quad channel trigger board of FIG. 1.
Figure 7A:
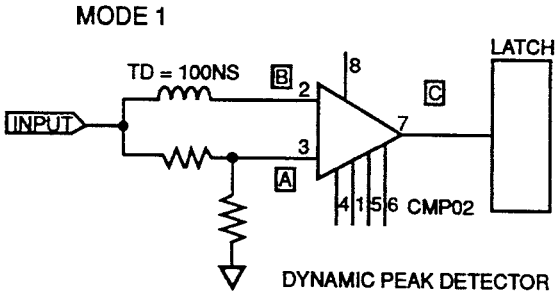
Figure 8A:
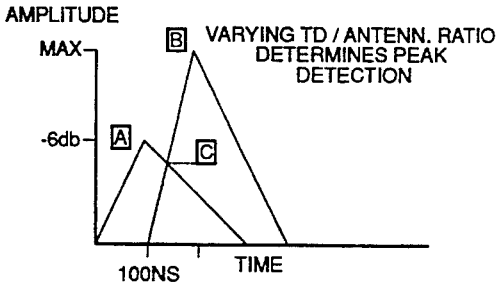
Figure 7B:
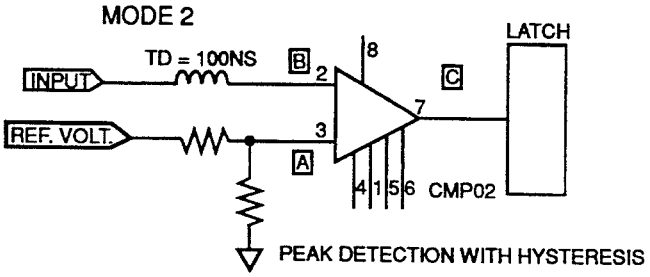
Figure 8B:
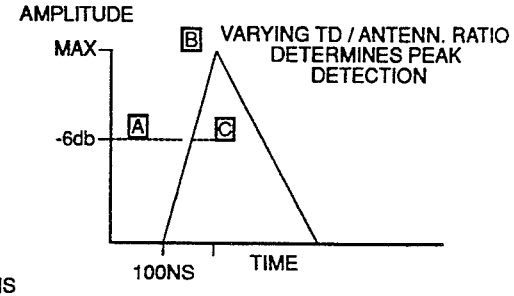
Figure 7C:
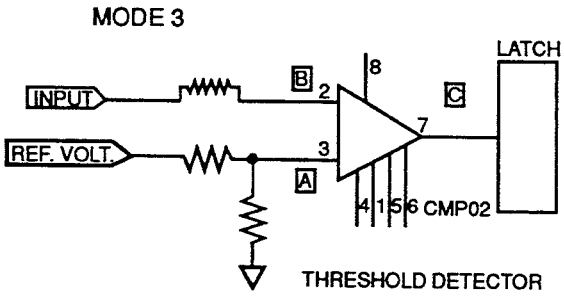
Figure 8C:
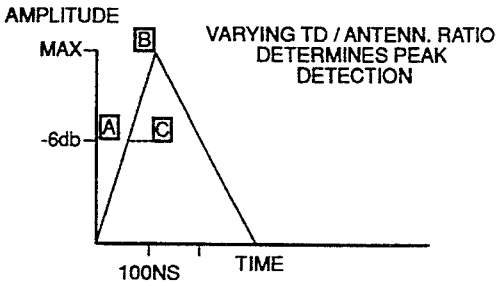

The Quad Channel Trigger Board Q1 is shown in FIG. 6. The sixteen boards are the same, and the four channels on each board have the same circuit, so only the first channel circuit CH1 is shown in detail. The principal component is a type CMP02 operational amplifier V2 used as a comparator. The BNC connector BNC1 is connected via a 0.01 microfarad capacitor RP1d, a type DDU-1504-100 delay device V1 which provides a 100 nanosecond delay, and a 5 K resistor R2 in series to the + input of the OP Amp V2. The—input is connected via parallel 5 K resistors RP1*a* and RP1*c* to VCC, and also via a 5 K resistor RP1*b* to ground. A 820 K resistor R1 provides feedback from the output to the + input. Pin 8 is connected to VCC and via a 0.1 microfarad capacitor to ground. Pins 1 and 4 are connected to ground, and pins 5 and 6 are connected together. The output goes to the clock input of a type 54LS74 flip flop V3A. The flip flop has the D and PR inputs connected to VCC, and the CL input to lead CLEAR.

Each quad channel trigger board has eight tri-state octal D-type transparent latches, type 54LS373, shown as registers 1R0–1R7 for board Q1 in FIG. 6. The not Q output from the flip flop of channel CH1 is connected to the gate input G of the first two registers 1R0 and 1R1, and the outputs of the other channels are each in like manner connected to the G inputs of two of the register units.

The two register units for each channel are used to store time values, which are binary coded on line TD0-11 using 12 bits. The eight D inputs for the first register of each channel, such as register 1R0 for channel CH1, are connected respectively to leads TD0-7, and the first four D inputs of the second register, such as register 1R1 for channel CH1, are connected respectively to leads TD8-11. The other four D inputs of the second register of each pair are grounded, but could be used to expand the timing bus to 16 bits, and are shown as bits TD12-15 to ground. The tri-state outputs of the register units may be enabled to read the data to line D0-7, using address signals to the inputs OC, with OC inputs of register units 1R0–1R7 being connected respectively to the eight leads of line 1CS0-7.

A light emitting LED diode DP1*g* used as a trigger indicator has its anode connected to VCC, and its cathode connected via a 330-ohm resistor to the anodes of four type 1N914 diodes DP1*a*–DP1*d*, which have their cathodes connected respectively to the outputs of the four channels CH1–CH4. A fifth type 1N914 diode DP1*e* has its cathode connected to resistor DP1*f*, and its anode connected via line 13 to the trigger indicator on the front panel.

OPERATION

Inter-connect each piezo-electric detector to the Bomb Sensor System via BNC connectors BNC1–BNC64 respectively. Connect a +6VDC battery to system via connector 22 "Power Plug." Turn power switch 14 on, the unit (FIG. 3) generates a power up reset at lead CLEAR. This resets the entire unit. If during operation it becomes necessary to reset the system un-guard switch 14 RESET/CLEAR and toggle. All channel card LED's (FIG. 6), and Yellow trigger light of unit 12 (FIG. 2) extinguish. Turn switch 18 "EPROM PROG" to program. The unit is now armed and ready to take data. When a fire command is sensed comparator 30 of the fire command circuit 10 (FIG. 2) triggers when the peak signal is detected The CMP-02 peak detector may be operated in several modes, as shown in FIGS. 7*a* to 8*c*.:

After the peak is sensed counter U4 (FIG. 2) is enabled via lead 9, flip flops U1A and U1B, and gate U3A, and starts to increment at the oscillator U2 rate (100 ns/pulse). Line drivers U7 provide the drive current for the timing bus TD0-11. The timing bus is available to each of the quad channel input trigger boards Q1–Q16. When a specific channel piezoelectric sensor detects an over pressure, that pulse is applied to its corresponding peak detector, via its BNC connector which toggles its respective latch (eliminating multiple triggering) and latches in the digital timing signal present at that time on the timing bus. For example, if a detected pulse is received at the connector BNC1 for channel CH1, the flip flop V3A is set, and register units 1R0 and 1R1 are gated to store the time value then present on the timing bus TD0-11. Each quad channel input trigger board has a LED that illuminates if any one of the four inputs trigger. The master trigger light of unit 12 on the front panel illuminates if any quad channel trigger board had sensed a trigger. At the end of count 4095 the counter U4 (FIG. 2) input is disabled by flip flop U1A being reset in response to the carry out signal from counter U4 via gate A3B. At this time each channel that has triggered has stored its time in a temporary holding register (such as registers 1R0 and 1R1 of FIG. 6 for channel CH1 and corresponding registers on this and the other quad channel trigger input boards for the other channels).

After a two-second delay generated by the one-shot unit U16 (FIG. 4), flip flop U18B is set and the programming of the EPROM memory U19 starts. Driver units U14 and U20 are enabled, and register unit U15 is tri-stated to the high-impedance output state. EPROM module EM is program enabled (24V out at VPP) via inverters U26F and U26E. The programming oscillator U23 free runs at 10 Hz with a 50% duty cycle but is locked out by gate U24B until in the programming mode. At this time the EPROM address register U27 (FIG. 5) is at zero (power up reset). The delay unit U25A provides a 50 ns delay required to allow the data to stabilize before using. The programming of the EPROM memory U19 is sequential, from the first address to the last. Procedures for programming are automatic and sequenced as follows:

(1) Set EPROM address counter U27 (starts at zero due to power-up reset).

(2) Transfer the address to the EPROM memory U19 via the driver unit U14.

(3) Select the quad channel decoder (FIG. 6). The decoder U29 decodes the EPROM address and every 16 counts increments to a new output which in turn enables the decoder chain comprising the ten decoders U30–U37. The quad channel timing registers (registers 1R0–1R7 of FIG. 6 and corresponding registers on the other quad channel trigger boards) transfer their contents to the register unit U22 in 8-bit bytes, i.e., Hi byte, Lo byte. When the register U22 clock pulse goes high the quad channel register data is latched into register U22 and transferred to the EPROM memory U19 via driver unit U20. After the 50 ns delay generated by the delay unit U25 the programming pulse is applied via the inverter U25D to the CE input of the EPROM memory U19.

(4) The EPROM address counter U27 is incremented by a pulse from unit U25 via the lead INCR.

(5) Steps 2 through 5 repeat until the decoder U29 decodes the 9th count of 16 from the counter U27 which is the count of 144. This equals a 16 count buffer (note the 0 output of the decoder U29 is not used) followed by a high byte (i.e., lead 1CS0) then a 1o byte (i.e., lead 1CS1) for each of the 64 channels. When unit U29 has decoded the proper count and has advanced to output 9, a reset pulse is generated by the One Shot unit A29 via lead END to the gate A3A (FIG. 3) and a driver of unit U7 to lead CLEAR.

At this time the system is transitioned to the computer read mode. The signal on lead CLEAR resets flip flop U18B, and the low signal at its Q output inhibits gate U24B to disable the programming oscillator U23. The signal from the not Q output of flip flop U18B via inverters U26F and U26E goes high, causing the EPROM module EM to output 5V at terminal VPP, which sets the EPROM U19 to the read mode. The signals from flip flop U18B also cause the drivers U14 and 20 to be tri-stated and driver U15 to be enabled. Oscillator A35 and shift register U42 sets the correct frequency for the Universal Asynchronous Receiver Transmitter (UART) U38 to operate at 9600 baud rate. The UART U38 is hard wired for 8 data bits, 1 stop bit and no parity. Computer read of the EPROM U19 may be random or sequential depending on the computer operator's preference. The computer operator will transmit the address he wants to read via the RS232 link and line 21. The unit U41A receives the serial data and converts the data to TTL levels. The UART U38 takes the serial data in at terminal SDI, and outputs it in 8-bit parallel at the set of terminals DO to the register unit U15. When the data is valid a signal at terminal DA goes high and latches the data into registers U15. The output of register unit U15 becomes the address A0-7 of the EPROM U19. After a 70-nanosecond delay, generated by unit B32, the flip flop U18A is set, to provide a low signal to the output enable terminal of the EPROM U19. The data at the specific address is coupled via transparent latches of the driver unit U21 to the set of DI terminals of the UART U38. After a one-microsecond delay, the one shots of unit B26 produce a 500-nanoseconds pulse to terminal DLS of UART U38, which latches the data and subsequently transmits the data in serial fashion from terminal SDO to the computer via the unit U40B, line 21 and the RS232 link. The UART U38 is reset and is now ready to receive the next command word.

ADVANTAGE AND NEW FEATURES. The system according to the invention has the ability to detect and output data that is not subjected to personal interpretation. All data is precise and accurate to ±50 ns. The manual system previously employed uses a host equipment and peripheral support devices yet has a recording capability of 4 channel and an accuracy of 1 micro-second. This invention provides a 16 to 1 increase in recording capacity and a 20 fold increase in precision. Reduction of data is automatic via computer software and essentially available in real time. Required support is limited to the single unit, Bomb Sensor System, which is integrated it a ruggedized chassis box approximately 19″×20″×7″ and a 6VDC storage battery.

ALTERNATIVES. Rearranging the peak detector configurations as shown in FIGS. *7a* to 8*c* allows for any variety of applications that require precise timing. The system as built has a 12-bit timing bus, however, this could be expanded to 16 bits by adding 4 wires to each quad channel trigger board and adding 1 integrated circuit. This would increase the data register capacity from 4096 bytes to 65,536 bytes. Data accuracies could be improved to ±25 ns by changing the master clock frequency from 10 MHz to 20 MHz. A majority of R&D test require a timed sequence of events. Therefore, this invention has the potential for universal application on tests that have a time correlation recording requirement.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A bomb sensor system for monitoring the effects of exploding devices and ascertaining the wavefront propagation by sensing the wavefront at a given number of points using a channel for each point, wherein said system comprises;

peak detector means individual to each channel for detecting the peak of a pulse associated with the wavefront to define the time of arrival at the point for the individual channel;

timing means comprising a counter, a timing pulse source providing a train of timing pulses at a given interval, timing input gate means coupling the timing pulse source to a clock input of the counter, a timing bus comprising N conductors coupled to parallel outputs of the counter on which a count value is encoded;

command means comprising fire detector means for detecting detonation of an exploding device and means set in response thereto for enabling the input gate means to start the counter running at a time designated t0;

channel register means individual to each channel, each having N parallel data input terminals coupled to the timing bus, a gate control terminal for controlling the loading of data, an output control terminal for enabling placing the data on a data bus, the gate control terminal being coupled to the peak detector means to load the the count value from the timing bus upon the detection of the peak of a pulse to thereby record the time with respect to T0.

2. A bomb sensor system according to claim 1, further including data selector means coupled to the output control terminals of the channel register means for addressing the channel register means of each channel in turn and reading the data onto the data bus;

a memory unit having a set of address inputs coupled to the data selector means, and data terminals coupled to the data bus for storing the data from the channel register means as each channel is addressed by the data selector means.

3. A bomb sensor system according to claim 2, further including transceiver means coupling the memory unit to a computer interface line for receiving addresses from a computer and coupling them to the memory unit, and for reading data from the memory unit for each address and supplying it to the computer.

4. A sensor system for monitoring an event at a plurality of points using a channel for each point wherein said system comprises;

detector means individual to each channel for detecting a pulse associated with the event to define the time of arrival at the point for the individual channel;

timing means comprising a counter, a timing pulse source providing a train of timing pulses at a given interval, timing input gate means coupling the timing pulse source to a clock input of the counter, a timing bus comprising N conductors coupled to parallel outputs of the counter on which a count value is encoded;

command means comprising start detector means for detecting a start of an event and means set in response thereto for enabling the input gate means to start the counter running at a time designated t0;

channel register means individual to each channel, each having N parallel data input terminals coupled to the timing bus, a gate control terminal for controlling the loading of data, an output control terminal for enabling placing the data on a data bus, the gate control terminal being coupled to the detector means to load the the count value from the timing bus upon the detection of a pulse to thereby record the time with respect to T0;

data selector means coupled to the output control terminals of the channel register means for addressing the channel register means of each channel in turn and reading the data onto the data bus;

a memory unit having a set of address inputs coupled to the data selector means, and data terminals coupled to the data bus for storing the data from the channel register means as each channel is addressed by the data selector means;

transceiver means coupling the memory unit to a computer interface line for receiving addresses from a computer and coupling them to the memory unit, and for reading data from the memory unit for each address and supplying it to the computer.

* * * * *